United States Patent
Gerling et al.

[11] Patent Number: 5,878,696
[45] Date of Patent: Mar. 9, 1999

[54] ABSORBANT ANIMAL BEDDING

[75] Inventors: Mark Gerling, Excelsior, Minn.; Patricia C. Dickey, Marble Falls, Tex.

[73] Assignee: Dickey Environmental Systems, LLC, Sharon, Wis.

[21] Appl. No.: 837,788

[22] Filed: Apr. 22, 1997

[51] Int. Cl.⁶ .................................................. A01K 1/015
[52] U.S. Cl. ...................................................... 119/526
[58] Field of Search .................................. 119/171, 172, 119/526

[56] References Cited

U.S. PATENT DOCUMENTS

| | | |
|---|---|---|
| 1,967,333 | 7/1934 | Smith et al. . |
| 2,373,877 | 4/1945 | Detwiler . |
| 2,597,457 | 5/1952 | Cook . |
| 2,848,976 | 8/1958 | Combs . |
| 3,066,646 | 12/1962 | Bramley . |
| 3,735,734 | 5/1973 | Pierce, III et al. . |
| 3,816,577 | 6/1974 | Neckermann et al. ................... 424/76 |
| 3,980,050 | 9/1976 | Neubauer . |
| 4,038,944 | 8/1977 | Tucci . |
| 4,206,718 | 6/1980 | Brewer . |
| 4,217,858 | 8/1980 | Dantoni . |
| 4,258,660 | 3/1981 | Pris et al. . |
| 4,275,684 | 6/1981 | Krämer et al. . |
| 4,278,047 | 7/1981 | Luca . |
| 4,404,061 | 9/1983 | Cael .......................................... 162/76 |
| 4,475,984 | 10/1984 | Cael .......................................... 162/76 |
| 4,519,340 | 5/1985 | Dickey . |
| 5,005,520 | 4/1991 | Michael .................................. 119/172 |
| 5,529,663 | 6/1996 | Springer ................................... 162/76 |
| 5,685,259 | 11/1997 | Santioemmo et al. .................. 119/172 |

FOREIGN PATENT DOCUMENTS

| | | |
|---|---|---|
| 2 443 255 | 7/1980 | France . |
| 5-328865 | 5/1992 | Japan . |

*Primary Examiner*—Robert P. Swiatek
*Assistant Examiner*—James S. Bergin
*Attorney, Agent, or Firm*—Merchant, Gould, Smith, Edell, Welter & Schmidt, P.A.

[57] ABSTRACT

An absorbant animal bedding made from ground, bleached, and dried corn stalks. A method for making the animal bedding using a tub grinder for grinding raw corn stalks to ground corn stalk pieces, a spray nozzle for spraying a bleach and sanitizing solution on the ground corn stalk pieces, a dryer system for drying the ground corn stalk pieces, a fire detection and extinguishment system for detecting and extinguishing any sparks or fire in the dried corn stalks after leaving the dryer system, a cyclonic separator for separating moist air from the dried corn stalk pieces, and mechanism for removing dust before the ground stalk pieces are conveyed to a packaging location.

1 Claim, 3 Drawing Sheets

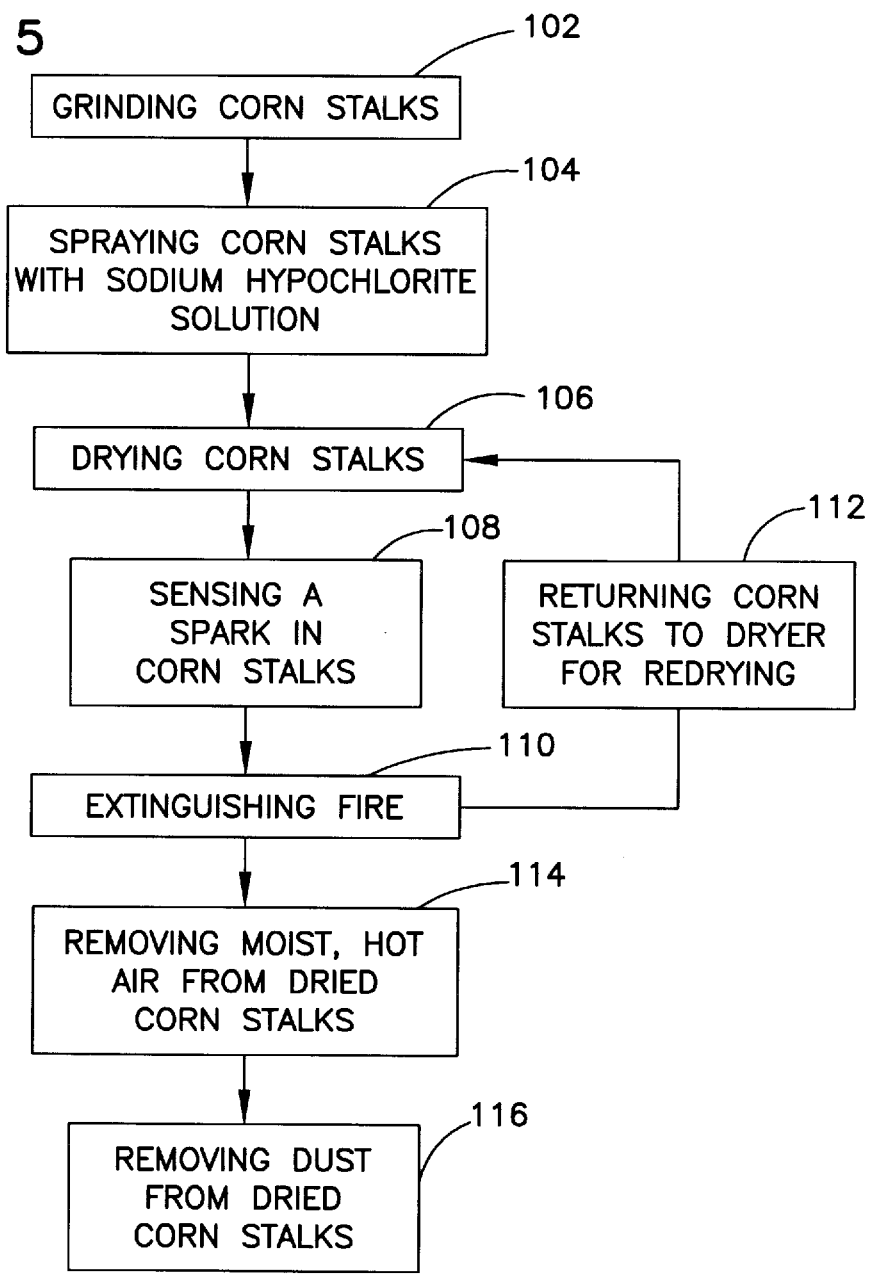

ABSORBANT ANIMAL BEDDING

BACKGROUND OF THE INVENTION

Many animals, such as cows, horses, mink, gerbils, rabbits, turkeys, chickens, etc. are kept in confined areas such as stalls or cages. Because accumulation of animal excreta inside of the stall or cage would be unsanitary and could cause health problems in both the animals and the people who work with the animals, it is important that the excreta be efficiently removed. Instead of washing out the inside of the stall or cage, an absorbent animal bedding can be used that absorbs and mixes with the animal excreta. Once the animal excreta is absorbed by or mixed with the absorbent bedding, the soiled bedding, along with the excreta, can be easily removed.

Many years ago, straw was used almost exclusively as a bedding material. However, straw is no longer widely used. The decline in the use of straw as an animal bedding can be attributed to the fact that straw is no longer thrashed, but combined. Combining separates the absorbent chaff from the straw portion. The absorbent chaff is then tilled into the soil. Therefore, the remaining straw does not have the absorbency of the straw product of years ago and consequently no longer makes an acceptable bedding. Additionally, straw is slow to decay and therefore massive amounts of straw and excreta commonly accumulate wherever the soiled bedding is disposed.

Today, a widely used bedding material is wood shavings, including sawdust. Wood shavings are easier to use, more economical, and much easier to clean from a stall than straw bedding. However, wood shavings are a by-product of a parent industry and are subject to the demands of that industry. Additionally, like straw, wood shavings are slow to decompose, taking approximately six years.

U.S. Pat. No. 4,519,340 to Dickey teaches an absorbant composition for animal excreta made from dried, chopped corn stalks. The composition contains dried, chopped corn stalks mixed with lime and an organic material having a density greater than the corn stalks such as wood shavings, hulls of cereal grains, chopped soybean stalks and chopped straw. The use of processed corn stalks as an animal bedding has many advantages over the use of straw or wood chips. Corn stalks are very pithy and therefore a bedding made of corn stalks is very absorbant. Additionally, corn stalks are a by-product of an annual crop and are therefore readily available.

Although corn stalks are absorbent and readily available, corn stalks are infrequently used as an animal bedding due to difficulties that arise when processing the raw corn stalks. Corn stalks typically contain excess moisture that must be removed prior to use as an animal bedding. However, corn stalks are highly flammable when dry and consequently are difficult to dry without causing a fire. A fire can not only slow production of the animal bedding, but a fire can destroy the entire processing plant. As a result, it has not been profitable to convert processed corn stalks into an animal bedding.

In addition to the problems associated with the production of animal bedding from corn stalks, the resulting bedding made from corn stalks can be dusty and infested with microbes. The dust present in the bedding, along with the microbes, can cause respiratory illness or other health related problems in the animals using the bedding.

Nonetheless, the widespread availability and absorbant nature of corn stalks makes the use of corn stalks as an animal bedding a desirable prospect. Therefore there is a need for a method to make an absorbant bedding out of corn stalks wherein the corn stalks are not ignited and the bedding is relatively free of dust and microbes.

SUMMARY OF THE INVENTION

The present invention is directed to an absorbant animal bedding made from corn stalks and a method for making the animal bedding.

A first aspect of the invention is directed to a method for making an animal bedding. The method involves grinding the corn stalks to a suitable size, spraying the ground corn stalks with a bleach solution to lighten the color of the ground corn stalks, and drying the ground corn stalks.

A second embodiment of the first aspect of the invention is directed to a method involving grinding corn stalks with a grinder, drying the corn stalks with a dryer, sensing with an infrared sensor a fire in the corn stalks after the corn stalks exit the dryer, and extinguishing the fire.

A third embodiment of the first aspect of the invention is directed to a method involving grinding corn stalks with a grinder, drying the corn stalks with a dryer wherein the dryer includes means for blowing heated air into the ground corn stalks so that dried corn stalks and moist air are created, and removing at least some of the moist air from the dried corn stalks using a cyclonic separator.

A second aspect of the invention is directed to an animal bedding made from corn stalks. The animal bedding has a distribution of lengths of corn stalk pieces with an average length being less than two inches. The moisture content of the animal bedding is less than 20% by weight. Additionally, at least 75% of the corn stalk pieces are bleached with a bleach solution so that at least the 75% are lighter in color relative to the remainder.

A third aspect of the invention is directed to an apparatus for making the animal bedding. The apparatus includes a tub grinder for grinding corn stalks, a bleach spraying system for spraying a bleach solution on the ground corn stalk pieces so as to lighten the color of the ground corn stalk pieces, a dryer for drying the ground corn stalk pieces, and a cyclone separator for removing at least some moist air from the dried corn stalk pieces. Additionally, there are conveyors between the grinder and the dryer, between the dryer and the cyclone separator, and between the cyclone separator and a location at which the ground corn stalk pieces are bailed or otherwise made available for use.

BRIEF DESCRIPTION OF THE DRAWINGS

FIG. 5 is a block diagram of the preferred embodiment of the process of the present invention.

DETAILED DESCRIPTION OF PREFERRED EMBODIMENT

Figure 1:
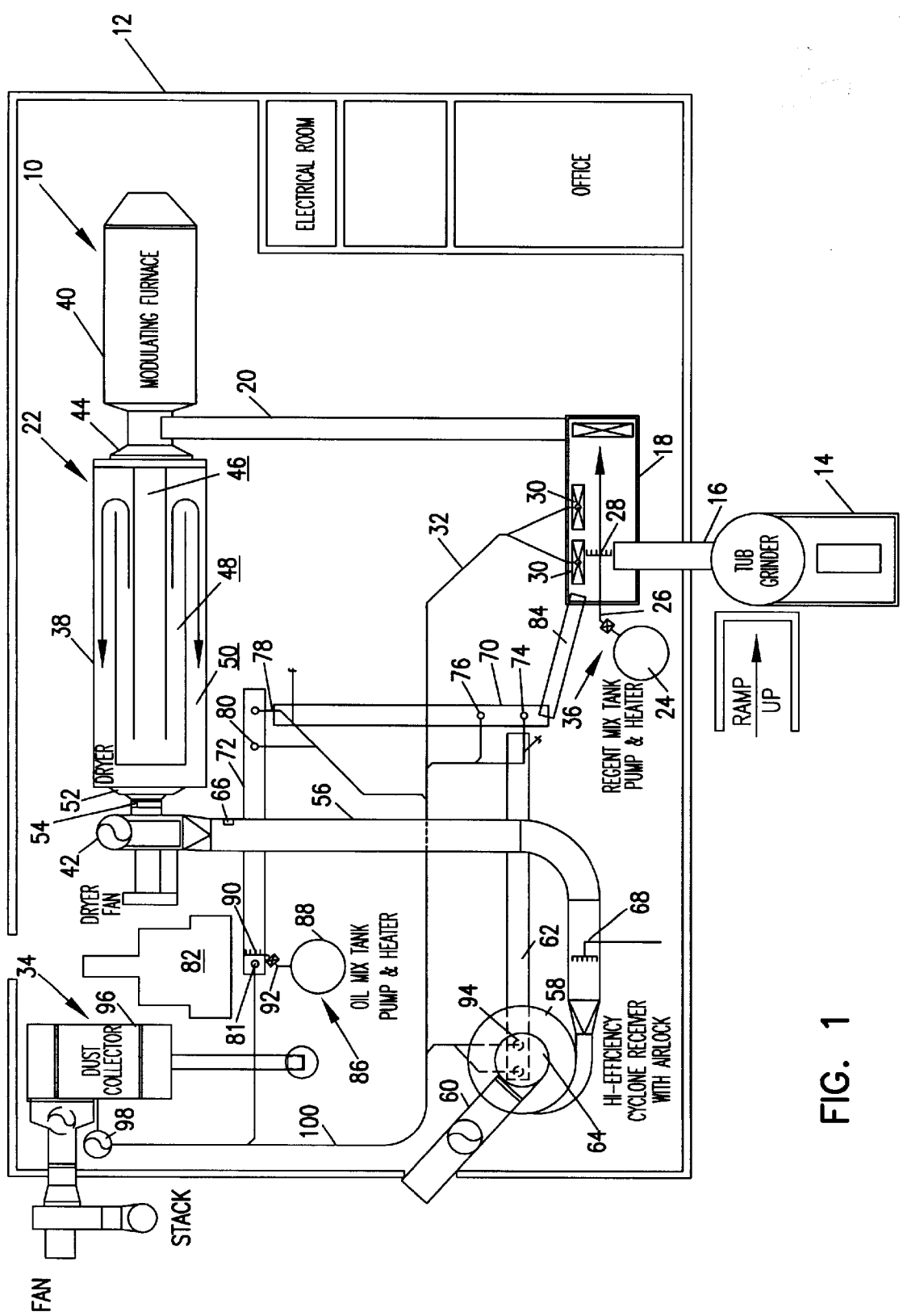
FIG. 1 is a plan view of the apparatus of the present invention.

Referring now to the drawings wherein like reference numerals designate identical or corresponding parts or method steps, and referring more particularly to FIG. 1, processing apparatus in accordance with the present invention is designated generally as 10. Apparatus 10 is shown as being enclosed in a building 12.

Apparatus 10 is directed to grinding corn stalks, bleaching and drying corn stalks, sensing and extinguishing any sparks as a result of the drying process, removing moist air, removing dust, and moving the corn stalk pieces between the various stations, including a final location for packaging, bailing, or other use. Throughout the present application, the word "stalk" is intended to mean the main stem and all its dependent parts, including leaves and cobs.

Considering the various parts of apparatus 10 in the order of the manufacturing process and with reference to FIG. 1, a tub grinder 14 is located outside building 12 and delivers ground corn stalk pieces via a trough or conveyor 16 to an apron feeder 18. An appropriate tub grinder is Progrind 2000 (Model 867) space unit with a 360 Hp diesel engine, all available from Olathe Manufacturing, Inc., 201 Leawood Drive, Industrial Airport, Kans. 66031.

The apron feeder 18 is similar to the apron in a manure spreader or other apron-type material advancing machine. Apron feeder 18 moves the ground corn stalk pieces to its downstream end and drops them onto a belt conveyor 20 for delivery to dryer 22.

In the region of apron feeder 18 where trough or conveyor 16 delivers the ground corn stalks, a bleach solution is sprayed by system 36 on the ground corn stalk pieces. That is, a mix tank assembly 24 provides solution via a plumbing system 26 to one or more nozzles 28. Mix tank assembly 24, plumbing system 26 and nozzles 28 are conventional and readily installable by one skilled in the art.

Conventional exhaust hoods 30 connected with lines 32 which lead to a dust collection system 34 provide for any removal of dust as a result of the ground corn stalk pieces being dropped onto and moved along by apron feeder 18.

Trough or conveyor 16, apron feeder 18, and belt conveyor 20 are all conventional and readily installable by those skilled in the art. It is preferable that apron feeder 18 run at variable speed and belt conveyor 20 run at a constant rate. There may be a metering device or apparatus which limits the volume of ground corn stalk pieces falling onto belt conveyor 20 from apron feeder 18. Trough or conveyor 16 runs at a variable speed rate so that accumulations do not develop on apron feeder 18.

The spray system 36 functions to wet at least 75% (and preferably close to 100%) of the ground corn stalks delivered to apron feeder 18 with a sanitizing and bleach solution so that the bleaching function discolors to a lighter color at least 75% (and preferably close to 100%) of the ground corn stalk pieces.

Dryer system 22 includes a dryer 38, a modulating burner 40, and a dryer fan 42. An appropriate dryer system is the 3-pass Baker/Rullman system available from Baker/Rullman Mfg., Inc., Box 67, Watertown, Wis. 53094.

Ground corn stalk pieces enter dryer 38 at an input end 44 and are vacuum conveyed with air heated by burner 40. The corn stalk pieces must traverse three lengths of dryer 38, i.e., first along a central space 46 and then back along a concentric space 48, only to return along an outer space 50 to exit end 52. The three-pass traversal is important since it provides an extended time within which the ground corn stalk pieces are in the dryer without making it necessary for the temperature within the dryer to be excessively high, since dried corn stalks are very flammable. In that regard, the moisture level of the corn stalk fed into tub grinder 14 can affect the operation of dryer system 22 in order to achieve the desired moisture content for the bedding product. A moisture level less than 20% by weight and preferably around 14% by weight is desired for raw product corn stalks at tub grinder 14. Moisture is added with the bleach solution sprayed on the ground corn stalk at nozzle(s) 28. The moisture level must be under 20%, and preferably under 14% by weight after traversing dryer 38. Ordinarily, the temperature at temperature sensor 54 should not exceed about 200° F. If the moisture content of the raw material, however, is higher than usual, the dryer system 22 may need to be operated so that the temperature at temperature sensor 54 is higher.

Fan 42 provides both the vacuum to pneumatically convey the bedding through the dryer and the pressure to pneumatically convey the dry bedding to the cyclonic separator. From dryer system 22, fan 42 blows the dried corn stalk pieces through a tube 56 to cyclonic separator 58. The dried corn stalk pieces are entrained in the hot air which also is holding much of the moisture. The cyclonic separator 58 is intended to separate the moist, hot air from the dried corn stalk pieces. The hot air is blown with fan 61 from the building at tube 60. The dried corn stalk pieces drop onto belt conveyor 62. An appropriate cyclonic separator is Model PE-96 which can be obtained from Process Engineering, Inc., 6426 Smithtown Road, Excelsior, Minn. 55331.

An airlock device 64 is fitted at the bottom of cyclonic separator 58. An appropriate airlock device is the 24 inch chain driven air-loc feeder obtainable from Koger/Air Corp., Box 2098, Martinsville, Va. 24113.

Dust is suctioned at hoods or collectors 94.

Since there are moving parts in dryer system 22 and since the corn stalk pieces are so hot and become entrained in the hot air, any sparking which may occur between moving parts can readily ignite the entrained corn stalk pieces. Also, if any small pieces of bedding become caught inside the dryer they will be heated to the point of flame ignition. To detect any sparks or fires, there is an infrared sensor mechanism 66 near fan 42. If any sparks or fire is detected, an extinguishing water spray system 68 has nozzles which direct a water spray into the downstream end of tube 56 to extinguish any fire.

An appropriate spark detection and extinguishment system is obtainable as Spark Detection and Extinguishment System (Oct. 13, 1995) from Robert White Industries, Inc., 10800 County Road 15, Plymouth, Minn. 55441.

Belt conveyor 62 leads from air lock 64 to reversible belt conveyor 70 which then leads to belt conveyor 72. Preferably, the dried corn stalk pieces drop about three feet (at least two feet) from belt conveyor 62 onto reversible belt conveyor 70. Similarly, the dried corn stalk pieces drop about three feet (at least two feet) from reversible belt conveyor 70 onto belt conveyor 72. The purpose of the drop is to liberate dust in the stream of dried corn stalk pieces. The dust is suctioned through hoods (not shown) at locations 74, 76, 78, 80, 81 into the dust removal system 34.

Belt conveyor 72 leads to a location 82 suitable for packaging the dried corn stalk pieces. The packaging could take the form of packaging in bags, packaging as bales, or simply containing in bulk.

A conveyor 84 extends between the upstream end of reversible belt conveyor 70 to apron feeder 18. If a fire in tube 56 is detected by the infrared sensor 66, the dried corn stalk pieces which get wetted by water spray system 68 accumulate within cyclone separator 58 and on conveyors 62 and 70. Thus, conveyor 70 is reversed in direction and with conveyor 62 operating in its normal direction, the wetted dried corn stalk pieces are directed onto conveyor 84 and back to apron feeder 18 so that the wetted corn stalk pieces can be redirected through the dryer system 22. When all the wetted corn stalk pieces have been returned to apron feeder 18, reversible belt conveyor 70 is reversed to operate in its normal direction again and conveyor 84 is turned off. Apparatus 10 is then completely restarted as appropriate and all parts of it synchronized appropriately. Conveyors 62, 70, 72, and 84 are all conventional.

A second spray system 86 is located near the downstream end of conveyor 72. Second spray system 86 includes a mix tank assembly 88 and one or more nozzle(s) 90 over belt conveyor 72, with an appropriate plumbing system 92 between nozzle(s) 90 and mixed tank assembly 88. Mixed tank system 86 sprays a fine mist of mineral oil and cedar (or other) scent onto the dried corn stalk pieces. The mineral oil functions to entrain any remaining dust and attach it to the corn stalk pieces. Mix tank assembly 88, plumbing system 92, and nozzle(s) 90 are conventional and readily installable by one skilled in the art.

The cedar (or other) scent provides a pleasant smell and, more importantly, keeps insects away from not only the bedding, but also any animals using it. Mineral oil is a commodity. Cedar scent is available in dry or liquid form from Oder Control Co., Inc., Box 5740, Scottsdale, Ariz. 85261. An appropriate mixture was ten pounds of mineral oil to one pound of cedar wood scent. The mixture was applied to 6000 pounds of ground corn stalks. There could be variations in the quantities of mineral oil and cedar (or other) scent of at least 10%.

Dust collection system 34 includes various suction collectors or hoods 30, 74, 76, 78, 80, 94. System 34 further includes a conventional industrial bag house system 96 with a fan 98 developing suction in an appropriate plumbing network 100. Plumbing network 100 simply connects the various items in a way known to those skilled in the art. The bag house system 96 is cleaned periodically as known conventionally. An appropriate bag house system is available as Model 120-WRVS-128 from Flex-Kleen, 1 Northwestern Center, 165 North Canal Street, Chicago, Ill. 60606.

Corn is an annual crop grown in large regions of the central United States and to a lesser extent in other areas of the United States. Corn is grown primarily for harvesting the kernels. The stalk is used on a limited basis as silage for cattle or other animals although most commonly it is tilled into the ground. Corn stalks are very pithy and, when dried, are highly absorbant. Thus, chopped or cut corn stalks may be spread in a stall, cage or other area frequented by an animal for the purpose of absorbing liquid waste and mixing with solid waste. The resulting combination of corn stalks and animal excreta may be aggregated and allowed to decay into an organic soil composition.

However, corn stalks are extremely flammable, frequently dusty and can contain potentially dangerous microorganisms. Therefore, the present invention is directed to methods for making an absorbant animal bedding from corn stalks wherein the corn stalks are lightened in color so as to show off the animals better, wherein the corn stalks do not cause a fire during processing, wherein moist hot air is removed from the dried corn stalk pieces, and also wherein the resulting animal bedding is relatively free of dust and microorganisms.

Thus, in its most complete form, as shown in FIG. 5, the invented method includes grinding corn stalks 102 with a grinder to create ground corn stalk pieces, spraying the ground corn stalk pieces with a chlorine bleach solution 104 to lighten in color and significantly sanitize the ground corn stalk pieces, drying the ground corn stalk pieces 106 with a dryer wherein the dryer includes means for blowing heated air into the ground corn stalk pieces to create dried corn stalk pieces and moist air, sensing with an infrared sensor 108 whether a fire is present in the dried corn stalk pieces, if a fire is present, spraying 110 the dried corn stalk pieces with water and directing 112 the dried corn stalk pieces sprayed with water back to the dryer for redrying, if a fire is not present, removing at least some of the moist air 114 from the dried corn stalk pieces using a cyclonic separator, dropping the dried corn stalk pieces 116 a vertical distance of at least two feet (preferably three feet) onto a conveyor such that dust is released, suctioning through a dust collector system the dust that is released, and moving the dried corn stalk pieces to a packaging location.

Figure 2:
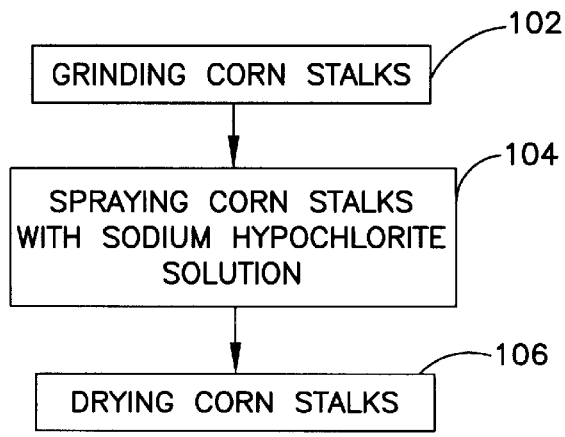
FIG. 2 is a block diagram of one embodiment of the process of the present invention.
Figure 3:
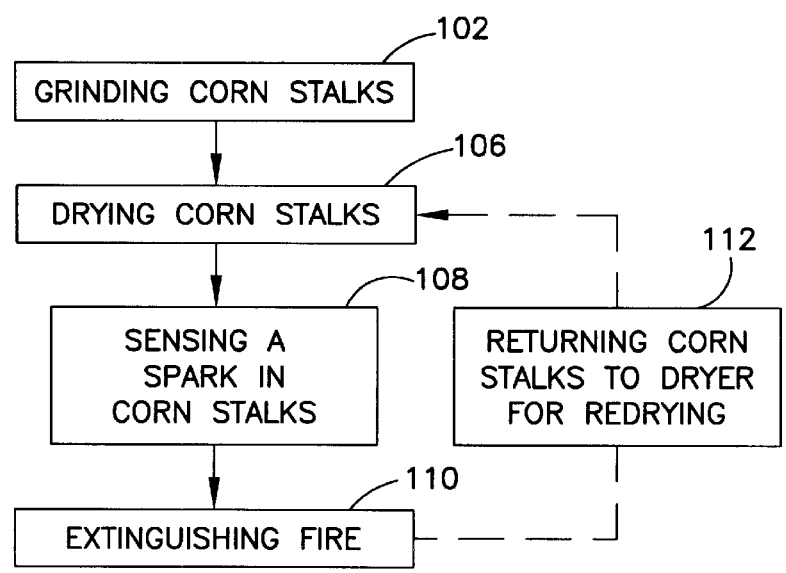
FIG. 3 is a block diagram of another embodiment.
Figure 4:
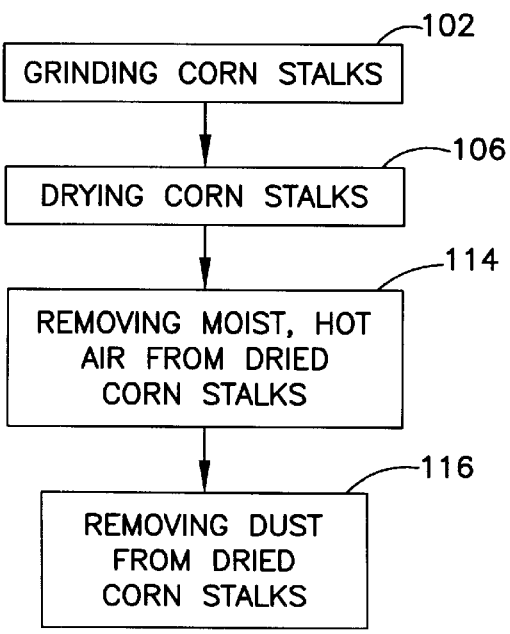
FIG. 4 is a block diagram of yet another embodiment.

There are other embodiments of the invented method which need not be as complete as just discussed. For example, as shown in FIG. 2, an acceptable absorbant bedding can be obtained by grinding corn stalks 102, spraying the ground corn stalks with a bleach solution 104, and drying the ground corn stalks 106. Another embodiment, as shown in FIG. 3, includes the steps of grinding corn stalks 102, drying the ground corn stalks 106, sensing with an infrared sensor 108 whether a fire or spark is present in the dried corn stalks, if a fire is present, extinguishing the fire by spraying with water 110, and then returning the moistened corn stalks to the dryer for redrying 112. Yet another embodiment, as shown in FIG. 4, includes grinding the corn stalks 102, drying the ground corn stalks 106, removing moist, hot air from the dried corn stalks 114, and removing dust from the dried corn stalks 116.

According to the present preferred invention, the corn stalks are first ground to a suitable distribution of lengths. The mean length of the ground corn stalk pieces can vary depending on the type of animal with which the bedding is used. Smaller pieces are highly absorbant while larger pieces provide volume. However, if the pieces are too large, excessive amounts of the bedding will be disposed of each time the stall is cleaned resulting in increased overhead.

According to the invention, the corn stalks are ground to a length such that most of the bedding falls through the tines of a pitchfork when the stall is cleaned. The corn stalks are preferably ground to have a distribution of lengths having a mean that is less than about two inches. More preferably, the corn stalks are ground to a mean length between about 1 inch to about 1.5 inches.

As the corn stalks are ground, a large amount of dust is created. According to the present invention, dust can be removed from the ground corn stalks immediately after grinding and/or at other points in the process. A suitable means for removing dust includes a conventional hood that as a part of dust collection system 34 will suction up the dust. Because the ground corn stalk pieces are heavier than the dust, system 34 removes a much larger percentage of dust than ground corn stalk pieces.

After the corn stalks are ground, they are transported to an apron spreader. The apron spreader serves two purposes.

The first purpose of the apron spreader is to spread out the ground corn stalks so that the corn stalks can be sprayed with a bleach and sanitizing solution, such as sodium hypochlorite. The corn stalk pieces are sanitized to reduce the quantity of active molds, pathogens, and other earth-borne contaminants. The corn stalk pieces are lightened in color to enhance consumer perception of the product. Lighter corn stalks appear cleaner and more sanitary and make the animal look better.

The second purpose of the apron spreader is to regulate the rate at which the ground corn stalks travel through the processing equipment. The rate at which the ground corn stalks leave the tub grinder is typically uneven. However, most dryers are sensitive to fluctuations in the rate at which materials enter the dryer. Therefore, it is important that the rate be normalized. Furthermore, the ground corn stalks should be bathed in the bleach and sanitizing solution long enough to ensure that microorganisms in contact with the solution are deactivated. The amount of time can vary depending on the concentration of the solution. By way of example, for a solution having 6% by volume sodium hypochlorite in water, the ground corn stalks should be in contact with the solution between thirty seconds and one minute. Thus, the apron spreader can be run at a rate which not only normalizes the amount of ground corn stalks delivered to belt conveyor 20, but also ensures that the time the ground corn stalks are on the apron spreader 18 and the belt conveyor 20 is sufficient for deactivating microorganisms. Both the bleach solution and the heat of drying combine to kill microorganisms.

The rate at which the ground corn stalks travel through the processing equipment is largely dependent on the capacity of the dryer. For the Baker/Rullman three-pass dryer discussed above, the ground corn stalks preferably should travel through apparatus 10 at a rate of about 6,000 lbs./hour. Clearly, all items need to be appropriately synchronized.

The ground corn stalks are dried to a low enough moisture level to prevent mold and mildew during storage and to enhance the absorptive properties of the corn stalks. Before drying, the ground corn stalks typically have a moisture content from about 18% to about 25% by weight. The dryer evaporates moisture present in the ground corn stalks until a preferred moisture content below 20%, preferably from about 12% to 15% is attained. The optimal temperature setting of the dryer varies with the moisture content of the corn stalks. For example, corn stalks with a higher moisture content can be dried at a higher temperature without combusting than ground corn stalks with a lower moisture content. It is preferable to process bulk raw corn stalks that have a relatively uniform moisture content.

After the ground corn stalks exit the dryer, they preferably pass an infrared detector that is capable of detecting sparks. If a spark is detected, the detection system activates a downstream water sprinkler system. The water sprinkler system must be far enough downstream so that when the detector detects a spark or fire, there is time for the sprinkler system to turn on and direct water into the dried corn stalks in advance of the fire reaching the water sprinkler location. The water sprinkler system should remain on until after the detection system no longer detects fire so that the entire volume of ground corn stalks in which fire was detected is moistened by the water sprinkler system.

Preferably the apparatus 10 has a mechanism wherein the moistened ground corn stalks in the volume where the fire was extinguished can be returned to the pre-drying stage so the entire system need not be shut down every time a spark is detected. A preferred mechanism involves the use of a reversible belt conveyor 20 that can return moist corn stalks to the apron spreader 18 via conveyor 84.

If no sparks are detected, the ground corn stalks travel to cyclonic separator 58 where moist air is separated from the ground corn stalks. Because the ground corn stalks are heavier than the moist air, upon entering cyclonic separator 58, the ground corn stalks fall to the bottom, while the lighter, moist air is suctioned out via a fan 61. To further insure separation of the moist air from the ground corn stalks, airlock 64 is installed at the base of the cyclonic separator 58. Optionally, dust is removed from the ground corn stalks at suction device 94 near cyclonic separator 58.

After moist air is removed from the ground corn stalks, the corn stalks are conveyed to packaging location 82. Along the way, the ground corn stalks are dropped at transfer points between conveyor belts to cause dust particles to separate from the slightly larger and heavier corn stalk pieces. A vacuum hood is preferably located above each drop site such that the liberated dust is sucked away when the ground corn stalks are dropped. Additionally, the ground corn stalks are preferably sprayed with mineral oil and cedar (or other) scent to reduce the amount of dust liberated when later used as an animal bedding.

Finally, even though the invention has been disclosed in detail, it is to be understood that it is not limited to the particular construction and arrangement of apparatus, composition and process disclosed and illustrated herein, but embraces all such equivalent forms thereof as come within the scope of the following claims.

What is claimed is:

1. An absorbant animal bedding made by the process comprising the steps of:

breaking corn stalks to a distribution of lengths having a mean less than two inches;

spraying said lengths of broken corn stalks with a bleach solution to deactivate microorganisms thereon and to lighten in color at least 75% of said corn stalks; and thereafter drying the corn stalks to a moisture content of less than 20% by weight.

* * * * *